(12) United States Patent
Noh et al.

(10) Patent No.: US 10,398,009 B2
(45) Date of Patent: Aug. 27, 2019

(54) LIGHTING DEVICE BASED ON SCENARIO-ACTIVATION USING PUSH SERVICE, AND PUSH SERVER, CONTROL DEVICE AND COMMUNICATION DEVICE FOR CONTROLLING THE LIGHTING DEVICE

(71) Applicant: LG ELECTRONICS INC., Seoul (KR)

(72) Inventors: Seunghyup Noh, Seoul (KR); Jaemoon Lee, Seoul (KR); Kyungtae Ro, Seoul (KR); Jae Myoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/048,651

(22) Filed: Jul. 30, 2018

(65) Prior Publication Data
US 2019/0037671 A1    Jan. 31, 2019

(30) Foreign Application Priority Data

Jul. 31, 2017    (KR) .................. 10-2017-0097140

(51) Int. Cl.
*H05B 37/02* (2006.01)
*H04L 29/08* (2006.01)
*H04W 4/12* (2009.01)
*H04L 12/28* (2006.01)

(52) U.S. Cl.
CPC ....... *H05B 37/0272* (2013.01); *H04L 12/282* (2013.01); *H04L 67/125* (2013.01); *H04L 67/26* (2013.01); *H04W 4/12* (2013.01); *H04L 2012/2841* (2013.01)

(58) Field of Classification Search
None
See application file for complete search history.

(56) References Cited

U.S. PATENT DOCUMENTS

2016/0050723 A1* 2/2016 Gochnauer .......... H05B 33/086
                                                         315/151

* cited by examiner

*Primary Examiner* — Dedei K Hammond
(74) *Attorney, Agent, or Firm* — Ked & Associates, LLP

(57) ABSTRACT

The present disclosure relates to a lighting device based on scenario-activation using a push service, and a push server, a control device and a communication device for controlling the lighting device. In one embodiment of the present disclosure, a push server for controlling a lighting device based on scenario-activation using a push service, may include: a communication unit for receiving a control message, based on a first communication protocol, from a control device and for transmitting the received control message to either a communication device or a push gateway based on the first communication protocol; a control message storage unit for storing, therein, the control message; a communication device-identification storage unit for storing, therein, identifications of communication devices to receive the control message; and, a control unit configured for controlling the communication unit, the control message storage unit, and the communication device-identification storage unit.

18 Claims, 12 Drawing Sheets

FIG. 2

| group identification | scenario identification | StartTime | pattern |
|---|---|---|---|
| ALL | 001 | 19:01 | RGB / ON_15 / OFF_15 / REPEAT_30 |
| GROUP1 | 002 | 19:50 | R / GRAD_10 / B / REPEAT_60 |
| GROUP2 | 002 | 19:50 | B / GRAD_10 / G / REPEAT_60 |
| GROUP3 | 002 | 19:50 | G / GRAD_10 / R / REPEAT_60 |
| GROUP1 | 003 | 20:35 | R / BLINK_30 / OFF |
| GROUP2 | 003 | 20:35 | OFF_30 / B / BLINK_30 / OFF |
| GROUP3 | 003 | 20:35 | OFF_60 / G / BLINK_30 / OFF |
| ALL | 004 | NULL | RGB / REPEAT_30 |
| GROUP1 | 005 | NULL | RGB / BLINK |
| GROUP2 | 005 | NULL | GRB / BLINK |
| GROUP3 | 005 | NULL | BRG / BLINK |

# LIGHTING DEVICE BASED ON SCENARIO-ACTIVATION USING PUSH SERVICE, AND PUSH SERVER, CONTROL DEVICE AND COMMUNICATION DEVICE FOR CONTROLLING THE LIGHTING DEVICE

CROSS-REFERENCE TO RELATED APPLICATION(S)

This application claims the priority of Korean Patent Application No. 10-2017-0097140 filed in Korea on July 31, 2017, in the Korean Intellectual Property Office, the disclosure of which is hereby incorporated by reference in its entirety.

BACKGROUND

1. Field

The present disclosure relates to a lighting device based on scenario-activation using a push service, and a push server, a control device and a communication device for controlling the lighting device.

2. Background

A lighting device may be placed in a performance hall, a concert hall, an art museum, etc. that accommodates many people, for guiding performances, instructing people to move within the space, or for cheering a player aesthetically. In particular, the lighting device provided to each individual may operate differently based on a particular location in the space or each individual owning the device.

When a large number of lighting devices are placed in a large space, command information must be delivered to each lighting device at a correct time to control these devices properly. In particular, allowing the lighting devices to operate correctly may lead to a need for a technique for allowing a plurality of lighting devices to operate simultaneously. In particular, allowing a very large number, for example, tens to hundreds of thousands of lighting devices to operate simultaneously without a temporal delay may lead to a need for a close operational relationship and pre-processing between the lighting devices and the control device. To this end, a technique may be needed to transmit a control message to the lighting device in a push manner and then to control a triggering of the lighting device based on the control message.

BRIEF DESCRIPTION OF THE DRAWINGS

The embodiments will be described in detail with reference to the following drawings in which like reference numerals refer to like elements wherein:

FIG. 2 shows a configuration of a scenario according to one embodiment of the present disclosure;

DETAILED DESCRIPTION

Examples of various embodiments are illustrated and described further below. For convenience of description, various components for implementing the present disclosure will be described. A plurality of components may be implemented in a single device or module. Alternatively, a single component may be implemented in a distributed manner in multiple devices or modules.

As used herein, a device that is carried by an individual or is provided to an individual and emits light in a variety of patterns, and that includes an auxiliary vibration function, may be referred to as a lighting device. The lighting device may be held by an individual in a venue, a concert, or the like, or may be provided as a fixed device type disposed in the seat for an individual.

Further, as used herein, manners in which the lighting device lights, flickers, or optionally vibrates may be referred to as a pattern. A combination of one or more patterns may be referred to as a scenario.

The lighting device may include a certain storage unit. The scenario as described above may be stored in the storage unit. The lighting device may operate based on the scenario. In particular, the lighting device comprises a communication unit. The lighting device may select a scenario based on the information received by the communication unit or may operate based on the selected scenario. Those will be described in more detail.

Figure 1:
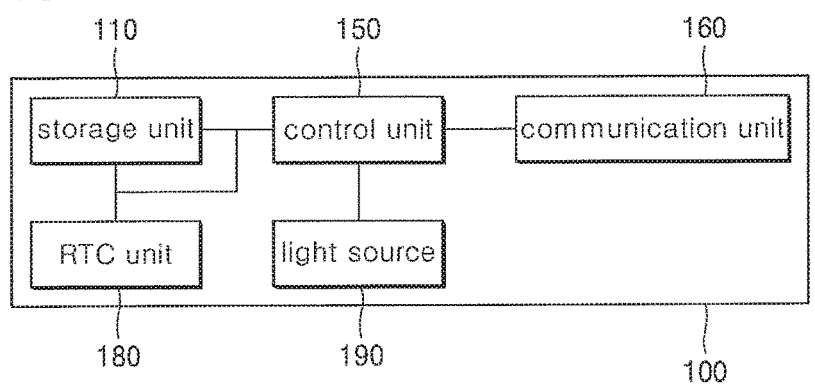
FIG. 1 shows a configuration of a lighting device according to one embodiment of the present disclosure.

FIG. 1 shows a configuration of a lighting device according to one embodiment of the present disclosure. The lighting device 100 may include a storage unit 110 (or storage, memory) for storing one or more scenarios that direct control of light output from a light source, a light source 190 for outputting light, a communication unit 160 (or communication module or interface) for receiving a control message for controlling operation of the scenario, and a control unit 150 (or controller, processor) for controlling the above component. The operation of scenario may include activation or deactivation of scenario. The storage unit 110 stores a scenario containing information (i.e., patterns, or a scenario including patterns) required for operating the lighting device 100. The storage unit may include, in one embodiment, a non-volatile memory, such as a flash memory.

The communication unit 160 may use radio frequency (RF) communication such as Bluetooth, Bluetooth Low Energy (BLE), Wi-Fi, ZigBee, UWB, etc., and may transmit and receive information with a second communication device. In this connection, the communication unit 160 receives a scenario from a first communication device. The communication unit 160 may then receive a control message from the second communication device to control activation of the scenario. In one embodiment, the first communication device and the second communication device may be the same device. Alternatively, they may be different devices. In the latter case, multiple lighting devices may be paired with the second communication device.

That is, the control message may be received by the communication unit 160 from the second communication device. Based on one or more protocols of Bluetooth, Bluetooth Low Energy, Zigbee or Wi-Fi, the control message may be transmitted from the second communication device to the communication unit.

The light source 190 may perform operations to flicker, or change a brightness of light, or emit light of a specific color, based on information stored in the storage unit 110 and control from the control unit 150. The light source 190 may include a light emitting diode (LED), a light bulb, or a light source including a specific light emitting material and may output light.

The control unit 150 may communicate with a separate communication device (e.g., a mobile phone, tablet computer, etc.) using the communication unit 160 and may receive the scenario as described above and then may store the scenario in the storage unit 110. Further, the control unit 150 may use the communication unit 160 to operate, i.e., activate/deactivate the light source 190 based on the scenario and based on the control message received from the communication devices as described above. In one embodiment, the scenario activation may control the light source 190 based on the pattern set in the scenario by the control unit 150. That is, the control unit 150 may control the light source 190 based on the scenario stored in the storage unit 110 and based on the control message received by the communication unit 160.

A RTC (real time clock) unit 180 may provide a real time clock. The real time clock may provide accurate timing information so that the scenario may be activated at a specific time. The RTC unit 180 may allow all lighting devices to be synchronized with one another. In addition, the communication unit 160 may receive the control message including timing information (i.e., timing information indicating a start or termination of activation of a scenario or pattern specified by the control message). In this connection, when a difference between a timing based on the timing information and a current time of the RTC unit 180 is equal to or greater than a predetermined interval (for example, 1 minute or 5 minutes), the control unit 150 may store the control message as a scenario in the storage unit 110.

In addition to the scenario, the storage unit 110 may store information about a group of lighting devices. The scenarios may be configured on a device-group basis. In one embodiment, although the lighting device has downloaded all the scenarios, the lighting device may operate based on a specific scenario indicted by the group information in the storage unit.

Figure 13:
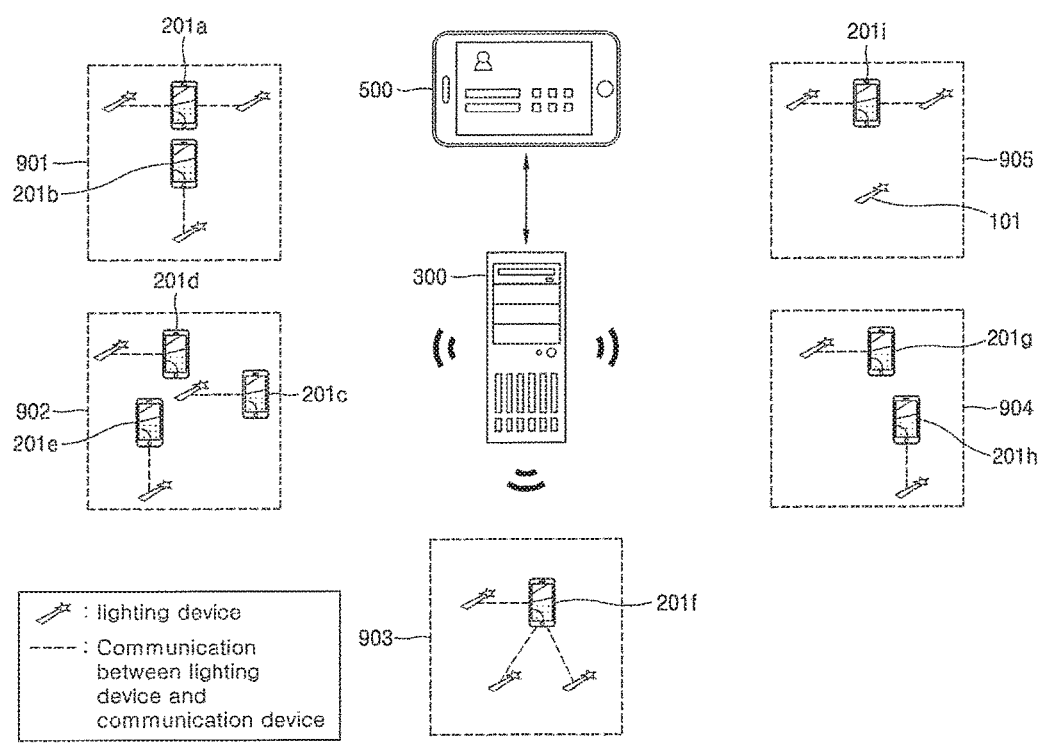
FIG. 13 shows a situation in which lighting devices are controlled by communication devices in a theater.

In order to control a large number of lighting devices as distributed in a theater as shown in FIG. 13, small size data must be transmitted. This ensures that each lighting device receives the data reliably. Therefore, in order to control the lighting devices in a specific space, transmission of a small size of data may be necessary as a prerequisite requirement for the scenario activation. Furthermore, in controlling the lighting device, a push service such as message queuing telemetry transport (MQTT) may be employed so that the control messages may be delivered effectively. In this connection, in the MQTT push service, a communication device, which may receive the control message, may be associated with the lighting device as described above. In addition, the control message having a small size of data may be repeatedly transmitted so that a network may be configured to improve transmission/reception reliability.

FIG. 2 shows a configuration of the scenario according to one embodiment of the present disclosure. The scenario may include a combination of patterns in which the lighting device 100 may operate. The scenario may control light outputs from the light source of the lighting device 100.

A group identification information in FIG. 2 allows a plurality of lighting devices arranged in a space such as a theater to be grouped into n groups. When the device groups correspond to different scenarios, the group identification information identifies the relationship therebetween. A scenario identification information in FIG. 2 may instruct a lighting device paired with a communication device as described below to operate based on a specific scenario corresponding thereto. In one example, when the communication device receives a command message including "scenario 002 activation" from the push server via push service, the communication device delivers the command message to the corresponding paired lighting device. In response, the lighting device executes a pattern corresponding to "002" among the scenario identification information.

In this regard, the lighting devices are grouped into multiple groups. Each lighting device may operate based on a group number corresponding to each lighting device. For example, when a specific lighting device belongs to a third group GROUP3, the lighting device receives a command message from the corresponding communication device, including "scenario 002 activation". In response, the lighting device may execute a pattern "G/GRAD_30/R/Repeat 60" corresponding to "002". StartTime in FIG. 2 may be information about when the scenario is activated. When there is such timing information, the control unit 150 may check the RTC unit 180 and control the light source 190 according to a corresponding pattern at a time based on the check result, even when there is no command from an external communication device. Depending on the pattern, the light source may perform a variety of operations, including emitting light of a particular color or flickering.

If StartTime indicates NULL, activation of a corresponding scenario may be performed only based on a message from the communication device.

In FIG. 2, the pattern may include a light emission color, a light emitting time, a light emission repeating period, or a blinking period, etc. for a light source 190. For example, R, G, and B indicate red, green, and blue, respectively. When the light source 190 is able to adjust the light more precisely, the light source may also output combined colors of RGB. For example, the RGB values may be rendered using three of one bit indicating on/off. For RGB 256 colors, 1 byte (8 bits) may be allocated to each of R, G, B colors. That is, RGB values may be defined using 3 bytes.

Alternatively, based on characteristics of the light source 190, color variations in R (red) may be defined to have 16 levels; color variations in G (green) may be defined to have 16 levels; and color variations in B (blue) may be defined to have 16 levels. Thus, each of R, G, B values may be defined using 4 bits. Thus, total R, G, and B values may be defined using a total of 12 bits. Alternatively, based on characteristics of the light source 190, color variations in R (red) may be defined to have 4 levels; color variations in G (green) may be defined to have 4 levels; and color variations in B (blue) may be defined to have 4 levels. Thus, each of R, G, B values may be defined using 2 bits. Thus, total R, G, and B values may be defined using a total of 6 bits.

In a variety of ways as described above, patterns may be configured to correspond to RGB combinations, individual R/G/B, or colors defined using a specific binary or hexadecimal number, etc. for light emitted from the light source. Alternatively or additionally, ON and OFF of the light source and its duration (seconds) may constitute a pattern. Alternatively or additionally, the number of iterations or a repeating duration may be set in a parameter "REPEAT" in FIG. 2.

In FIG. 2, GRAD refers to a manner in which light from a light source gradually changes in a gradation mode. In one embodiment, the first group scenario 002 may be "R/GRAD_10/B/REPEAT_60". This means that a color from the light source changes from red to blue in a gradation mode for 10 seconds, and such gradation-based change repeats 60 times or 60 seconds. BLINK in FIG. 2 indicates blinking.

The pattern configuration may vary based on characteristics of the light source 190. Thus, the present disclosure is not limited to the above-described pattern configurations.

In addition, FIG. 2 shows each scenario corresponding to each group. However, when the lighting device 100 is not set to a specific group, the device 100 may receive all scenarios corresponding to all groups from the communication device. Alternatively, when the lighting device 100 is set to a specific group, the device may receive only a scenario corresponding to the specific group. Alternatively, even when the lighting device 100 is set to a specific group, the device 100 may receive all scenarios corresponding to all the groups from the communication device. The received scenario(s) may be stored in the storage unit 110.

The scenarios may be configured to include the patterns that contain information indicating the color or brightness of the light as emitted by the light source 190, as shown in the scenarios in FIG. 2. Additionally or alternatively, the scenarios may be configured to include patterns containing information indicating timing or duration for operations, such as, light emission, flickering, or turning on or off by the light source 190.

Implementing the configuration of FIG. 1 and FIG. 2 may allow the lighting devices to perform lighting functions in a space that accommodates a large number of people, such as a theater. Thus, the lighting devices may be collectively controlled. In particular, when a push server, which will be described later, transmits a control message to communication devices in a push manner, the control message may be sent to the communication devices, at once, in a push manner. The communication devices, upon receiving the control message, may transmit the control message to the lighting devices using a short-range communication protocol such as Bluetooth, BLE, or ZigBee.

As a result, the push server may perform collective control of a large number of lighting devices. Particularly, when a control message is transmitted to tens of thousands of communication nodes simultaneously, a possibility of occurrence of communication disconnection and delay may increase. However, in accordance with the present disclosure, the scenario may be pre-stored in the storage unit, and a specific scenario may be triggered at a specific time. In this way, transmission of the control message indicating a scenario containing a pattern in which the lighting device should be operated in real time may be implemented in a push manner. This may prevent communication omission and disconnection. Therefore, a problem such as a reception missing or a disconnection occurring in a process of controlling many lighting devices, or a delay problem due to an increase in the amount of data may be suppressed, which may otherwise occur conventionally.

In addition, upon applying the scenario storage scheme according to the present disclosure, only a message (a trigger message) triggering the scenario or a message suspending the scenario may be repeatedly transmitted, which may increase control reliability.

Figure 3:
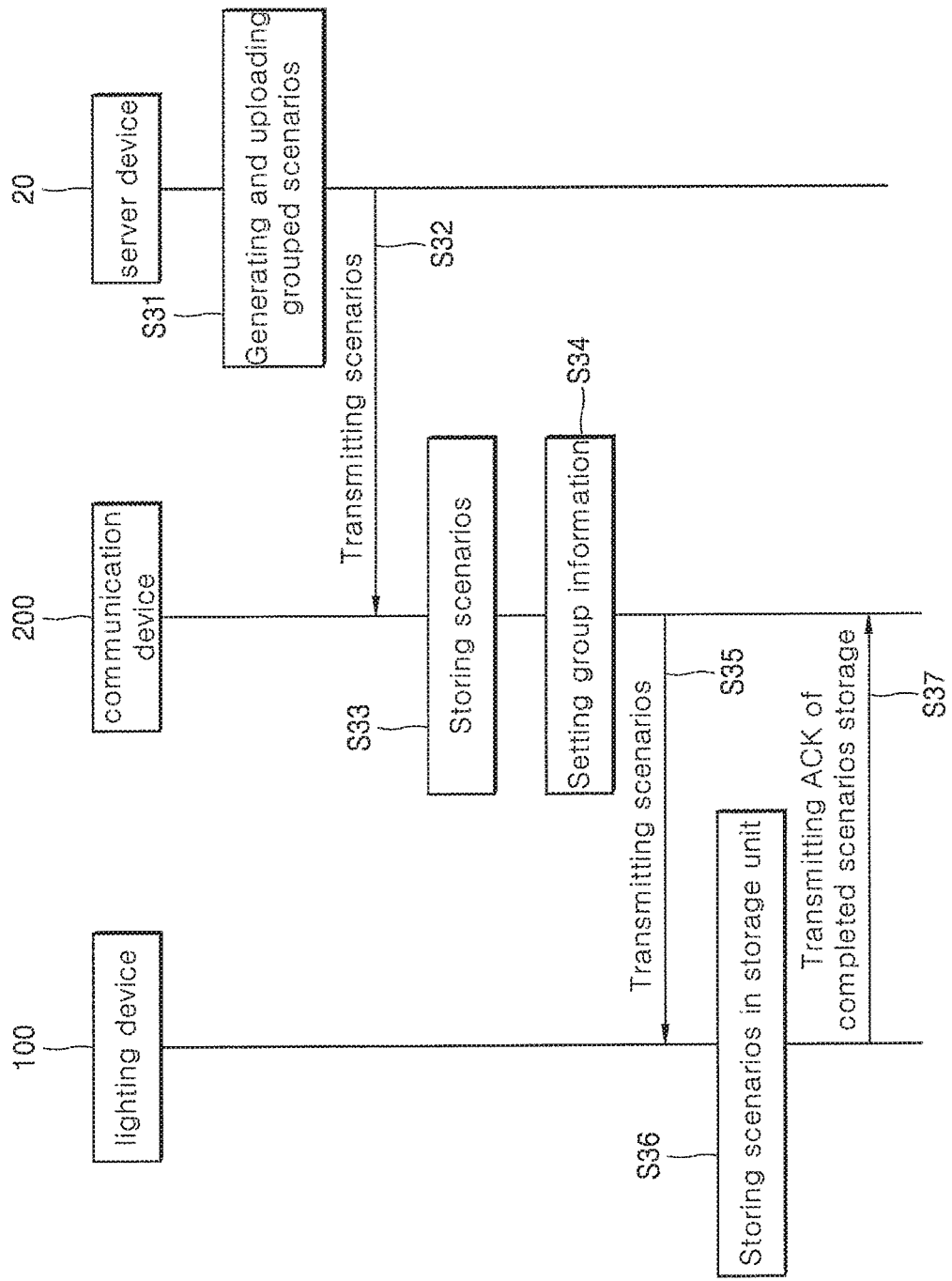
FIG. 3 shows a process for storing a scenario in a storage unit of a lighting device according to one embodiment of the present disclosure.

FIG. 3 shows a process for storing a scenario in the storage unit of a lighting device according to one embodiment of the present disclosure. A software (i.e., application) installed in the communication device 200 may receive the scenario from the server device 20 containing the scenario and provide the same to the lighting device 100.

First, the server device 20 generates and uploads scenarios grouped on a seat or timing basis (S31). The scenarios may be designed by a planner of the performance. As shown in FIG. 2 above, the scenarios may be configured to include various patterns. Various patterns may be designed, including a pattern that allows the lighting device to render a specific color after a start of a specific song. This is illustrated in FIG. 2.

Then, the application of the communication device 200 receives the scenario from the server device 20 (S32). The communication device 200 stores the transmitted scenario (S33).

In the transmission process of the scenario, the server device 20 may store identification information (AppID) of the communication device 200. Such an AppID may be used in a process in which a push server, which will be described later, transmits a control message in a push manner using the identification information of the communication device 200. That is, the identification information stored in the server device 20 may subsequently be stored in the push server.

An user of the communication device 200 sets group information about scenarios to be used (S34). Such information may vary depending on a location of the corresponding user, a seat in which the corresponding user is located, or a type of a ticket purchased by the user. In addition, the application of the communication device 200 may contain a separate identification information AppID. When the push server, which will be described later, transmits a control message only to a specific communication device 200 or a communication device 200 belonging to a specific group. The push server may use the identification information AppID of the application. The identification information may include identification information of an application operating in a background in the communication device 200. The information may include, in one embodiment, information about an account logged into the application. The identification information may include communication-related identification information of the communication device 200. In one example, the communication-related identification information may include a telephone number of the communication device 200 and the like.

Furthermore, before the lighting device 100 downloads the scenario into its storage unit, the communication device 200 may receive information such as a ticket number or a ticket seat number of an audience using the application of the communication device 200 in a QR code tagging manner or via directly inputting numbers and letters from a user thereof. Alternatively, the user of the device 200 may enter ID and password and enter a seat number.

Then, the communication device 200 stores the scenario set based on various embodiments (S33) and sets group information (S34). Then, the communication device 200 transmits the scenario to the lighting device 100 (S35). The lighting device 100 and the communication device 200 pair with each other using a short distance communication such as Bluetooth or BLE, etc. Over this short-range communication, the scenarios stored in the communication device 200 may be transmitted to the lighting device 100. The lighting device 100 stores the scenario(s) in the storage unit (S36). Optionally, the lighting device 100 may send an ACK (Acknowledge) message to the communication device 200 informing that the scenario storage is completed. In FIG. 3, the communication device 200 may be paired with one or more lighting devices. In one embodiment, a lighting device may be paired with one communication device. Then, a process for storing a scenario may be performed. In another embodiment, more than one lighting devices may be paired with a single communication device. Then, a process for storing a scenario may be performed.

In FIG. 3, the scenario transfer at operation S32 may involve transmission of all group scenarios. Alternatively, when the communication device 200 sets a group in advance, for example, when the communication device 200 has set group information such as ticket information, seat information, etc. prior to operation S32, the server device 20 may distinguish between a scenario applied to a corresponding group and a scenario commonly applied to all groups and may transmit them.

Figure 4:
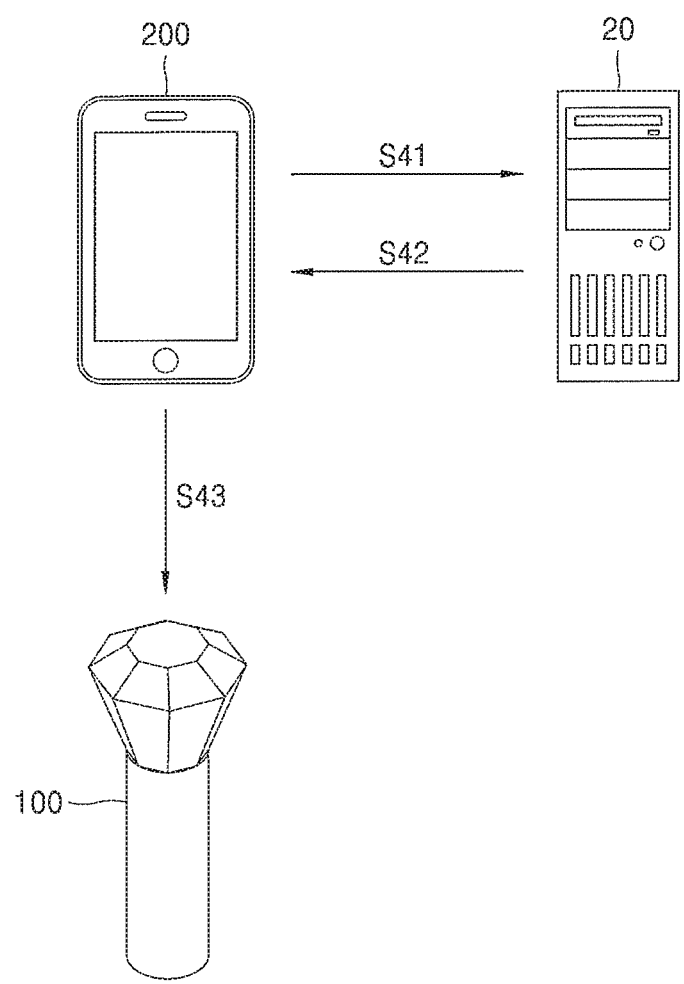
FIG. 4 shows an example of storing a scenario in various communication protocols between a lighting device and a communication device according to one embodiment of the present disclosure.

FIG. 4 shows an embodiment of storing a scenario using various communication protocols between a lighting device and a communication device according to one embodiment of the present disclosure. The communication device 200 may communicate with the server device 20 using LTE or Wi-Fi. When the user log-ins or inputs a seat number of a ticket using a software installed in the communication device 200 (S41), the communication device 200 receives from the server device 20 a scenario to be downloaded into the lighting device 100 to be provided to the user (S42). The received scenario may be a scenario corresponding to a specific group or a scenario commonly applied to several groups. The communication device 200 then transmits the scenario to the lighting device 100 using Bluetooth or BLE. Since the scenario corresponds to a group to which the lighting device 100 belongs, a following operational advantage may be achieved: without a separate manipulation from the user, the lighting device 100 operates based on the scenario or based on a control message. In this connection, the push server transmits the control message, in a push manner, to the communication device 200, which, in turn, delivers the message to the lighting device 100.

The embodiment of FIG. 4 may be performed before the user arrives at the venue. Alternatively, the embodiment of FIG. 4 may be performed when the user arrives at the venue.

Figure 5:
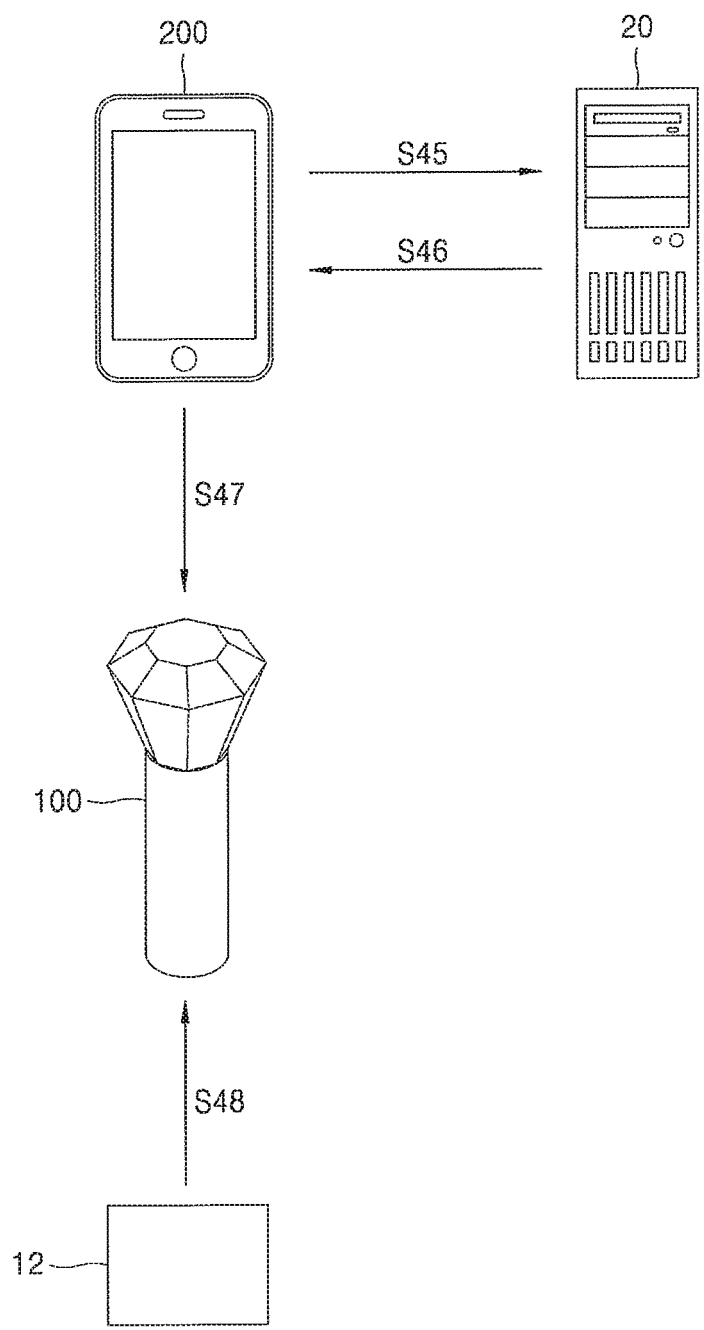
FIG. 5 shows an example of storing a scenario in various communication protocols between a lighting device and a communication device according to another embodiment of the present disclosure.

FIG. 5 shows an embodiment of storing a scenario using various communication protocols between a lighting device and a communication device according to another embodiment of the present disclosure. Unlike the embodiment of FIG. 4, in this embodiment, the operation of the user to log in or enter the seat number of the ticket is optional. The communication device 200 requests the server device 20 to transmit a scenario (S45). Then, the server device 20 transmits a scenario to the communication device 200. In this connection, the scenario to be transmitted may include scenarios corresponding to multiple groups. When the scenarios are grouped into a total of five groups, all of the scenarios corresponding to the five groups may be transmitted in operation S46.

Thereafter, the scenarios corresponding to the multiple groups are transmitted between the communication device 200 and the lighting device 100 using Bluetooth or BLE (S47). The lighting device 100 then stores scenarios corresponding to the multiple groups. In this connection, the communication device 200 and lighting device 100 may set group information based on a ticket number or group information based on user's login information. However, as in the embodiment of FIG. 5, the user tags the lighting device 100 on a RF tag 12 arranged in a seating area of the theater or a concert hall (S48). In this way, a group corresponding to a scenario to be used by the lighting device 100 may be determined.

Referring to FIG. 4 and FIG. 5, the communication unit 160 of the lighting device 100 receives a scenario from the communication device 200. The control unit 150 of the lighting device 100 stores the received scenario in the storage unit 110. In this connection, the scenario is automatically activated when a specific time associated with the RTC unit 180 of the lighting device 100 has elapsed. In a response, the control unit 150 may control the light source 190 based on a pattern included in the scenario. Alternatively, the control unit 150 may control the light source 190 based on a specific control message received by the communication unit 160. In this connection, the control unit 160 may receive the control message once. Alternatively, the communication unit may repeatedly receive the same message. When the communication device 200 repeatedly receives the control message from the push server, reliable reception of the control message may be achieved. Further, in the pairing process between the communication device 200 and the lighting device 100, the control message may be repeatedly transmitted for secure transmission of the control message.

In one embodiment, in the process of FIGS. 3 through 5, the communication device 200 provides a scenario to the lighting device 100. The communication device in the venue receives a control message from the push server. To this end, the push server transmits a control message to a push gateway or push broker. The push gateway may forward the received control message to a plurality of communication devices. This process will be discussed in more detail.

Figure 6:
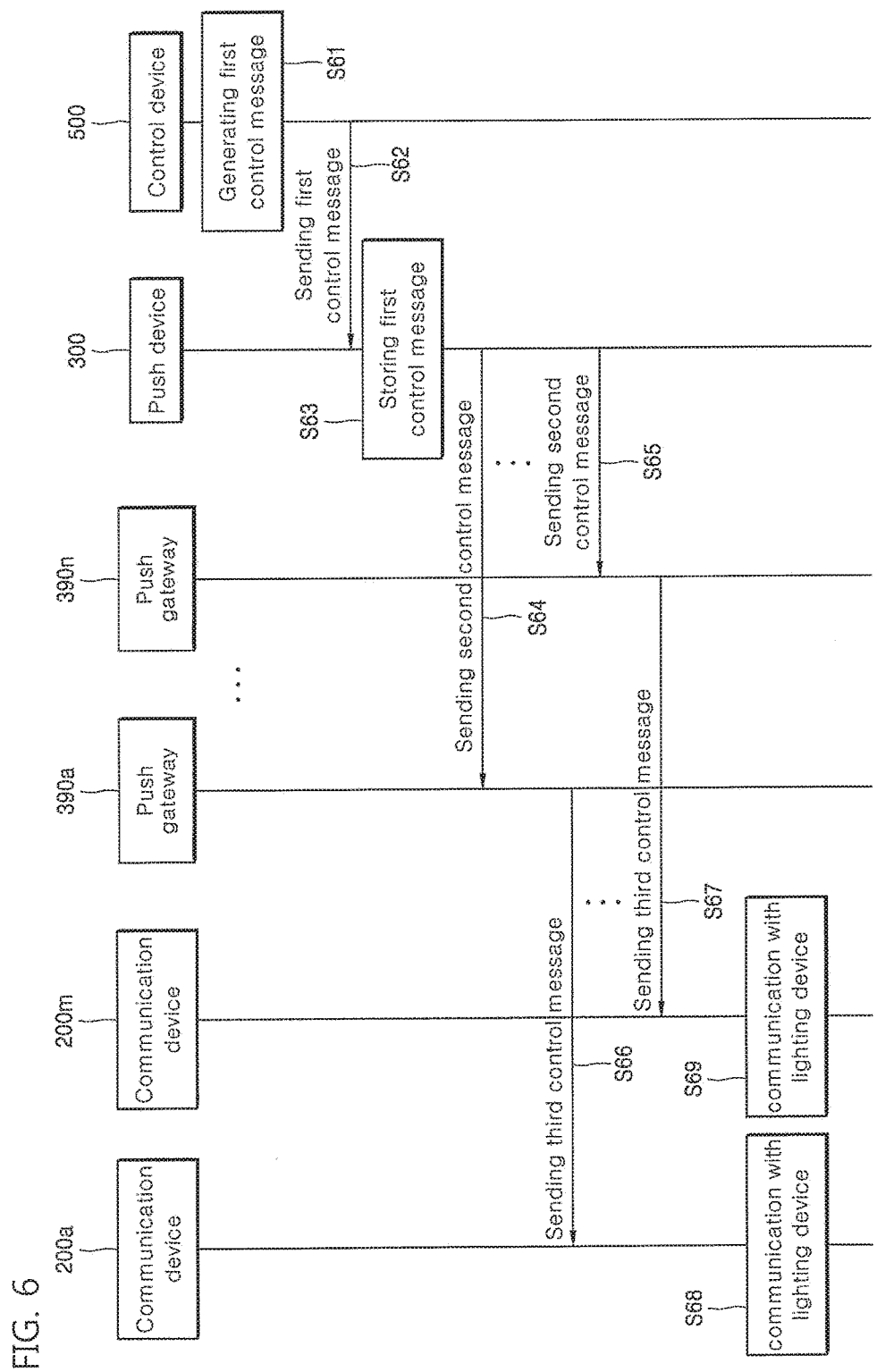
FIG. 6 shows a control process between a control device and a communication device according to one embodiment of the present disclosure of the present disclosure.

FIG. 6 shows a control process between a control device and a communication device according to one embodiment of the present disclosure.

The control device 500 generates a first control message to be transmitted to a plurality of communication devices (S61). The first control message may be transmitted through various devices finally to the communication device in a form of a third control message. Each of the communication devices 200a to 200m controls an operation of a lighting device paired therewith using the third control message. In one embodiment, the third control message may indicate a specific number of a scenario to be activated. The third control message may be configured to include information about a current time, a scenario number, and a start time, as in a following Control_Message:

Control_Message="19:25/Scenario 003/19:30".

Alternatively, the control message may indicate to stop a currently-activated scenario as follows:

Control_Message="19:25/STOP_SCENARIO/19:26"

Alternatively, the control message may instruct to restart a currently-activated scenario as follows:

Control_Message="19:25/RESTART_SCENARIO/19:26"

Alternatively, the control message may simply control all lighting devices to turn all lighting devices on or off. Alternatively or additionally, the communication device provides specific color information (RGB) to the lighting device. In response, the light source of the lighting device may emit light of the corresponding color. The third control message may generally be the same as the first control message. In particular, in terms of a start command or indication of a specific scenario, the first control message and the third control message may be identical with each other. However, headers of the first message and the third message may be different from each other based on different communication protocols for transmissions of the first and third messages.

That is, the third control message may be used to start a scenario stored in each lighting device 100 controlled by each communication device. Alternatively, the third control message may stop the currently-activated scenario or indicate a specific pattern. Thus, the third control message may include information to instruct the lighting devices to activate the common scenario. Alternatively, the third control message may include information for controlling different scenarios stored in advance in the lighting device. As used herein, control of a scenario may involve changing a scenario, or allowing a lighting device operating based on a specific scenario to activate another scenario.

In particular, according to the present disclosure, the push server 300 may send the control message to each of the communication devices 200a to 200m via one or more push gateways 390a to 390n. The control messages sent to the communication devices 200a to 200m may be the same or may be different based on different communication protocols corresponding thereto.

Each of the push gateways 390a to 390n may include a mobile communication server, such as a 3G, 4G or 5G mobile communication server providing each communication service to each of the communication devices 200a to 200m. Alternatively, each of the push gateways 390a to 390n may transmit data to each of the communication devices 200a to 200m based on TCP/IP. In the embodiment of the mobile communication server, each of the push gateways 390a to 390n may be embodied as a top server of a communication company or a base station server thereof. Each of the push gateways 390a to 390n may transmit data directly to a TCP/IP destination or may be connected to a TCP/IP destination using a mobile communication protocol. Therefore, the communication protocol between each of the push gateways 390a to 390n and each of the communication devices 200a to 200m may not be particularly limited.

The third control messages received by the lighting devices from the communication devices 200a to 200m may be identical with each other between the lighting devices. Alternatively, the lighting devices may receive different control messages based on controls of the communication devices 200a to 200m. However, when each of the lighting devices interprets and applies each third control message, each third control message may vary based on scenario information stored in each lighting device.

That is, even when all communication devices send a third control message indicating the same scenario operation, for example, "scenario 1 activation" to the lighting devices, and, if patterns corresponding to "the scenario 1" stored in the lighting devices are different from each other, the lighting devices may operate in different manners. This allows the lighting devices to operate in a variety of ways.

Furthermore, the first or the second or third control message may contain specific group information. For example, the control message indicating turn-on/off of the lighting devices belonging to the group 1 may be configured as follows: the control message instructs the lighting devices belonging to the group 1 to blink red light:

Control_Message="TO: GROUP1/LIGHT_RED_BLINK"

Each of the above-described control messages selects communication devices paired with the lighting devices belonging to the group 1. Then, the control messages may be sent only to the selected communication devices. The push server 300 of FIG. 6 stores identification information of all communication devices, or stores group-based identification information. Then, the control from the control device 500 may allow a control message to be transmitted to all communication devices in a push manner. Alternatively, the control from the control device 500 may allow a control message to be transmitted in a push manner to group-based communication devices.

When the control message is generated, the control device 500 transmits the first control message to the push server 300 (S62). The control message may be communicated between the push server 300 and the control device 500, using various communication protocols such as TCP/IP or Wi-Fi.

Then, the push server 300 transmits the received first control message to one or more push gateways 390a to 390n as the second control message (S64 to S65). In one embodiment of the present disclosure, the push server 300 may use a Message Queue Telemetry Transport (MQTT) protocol. In this case, the push server 300 and the push gateways 390a to 390n may communicate with each other based on the MQTT protocol. The second control message may be a message generated by configuring a portion (e.g., a header) of the first control message according to the MQTT protocol.

The push gateways 390a to 390n may be base stations disposed adjacent to a concert hall or a music concert hall. Alternatively, the push gateways 390a to 390n may receive the second control message via an uppermost central server of a mobile communication company. The second control message includes information about a communication device or an application thereof, which may be a destination of the second message.

The push gateways 390a to 390n may transmit the received second message to the respective communication devices 200a to 200m in the form of a third control message (S66 to S67). In one embodiment, the third control message may be transmitted in a unicast manner to each of the communication devices 200a to 200m. Alternatively, the push gateways 390a to 390n may transmit the third control message to some of the communication devices in a broadcast or multicast manner.

In the case of a unicast transmission, the identification information (e.g., App_ID) of the communication devices 200a to 200m that are the destinations of the control message may be stored in the push server 300 (e.g., MQTT server). In the process during which the push server 300 sends the second control message, the push server may include the identification information in the second control message.

In the process of operations S66 to S67, the control message may be received by the communication devices 200a to 200m. Then, the communication devices 200a to 200m which have received the control message may communicate with the lighting devices paired therewith (S68, S69). The communication protocol between the communication devices 200a to 200m and the lighting devices 100a to 100m may embodied as Bluetooth, BLE, or the like. The present disclosure is not limited thereto. The communication protocol may include a ZigBee or UWB as a short-range communication protocol.

The lighting devices 100a to 100m may then control their light sources based on the received control message. Controls of the light sources may occur simultaneously.

In operations S68 and S69, one communication device may communicate with one or more lighting devices. In one example, 10 or fewer lighting devices may be paired simultaneously with one communication device. When acquaintances in the same venue have respectively lighting devices that store therein the same scenario corresponding to the same group, the multiple lighting devices may be connected to one of the communication devices owned by one person of the acquaintances. In this case, the number of communication devices may be smaller than the number of lighting devices disposed in the entire space of the theater. In this way, communication efficiency between the push server and the communication device may increase. This will be discussed in more detail in FIG. 8.

When the received control message is not a message of an immediately-executed type, for example, when the control message is a control message of a type that is executed after a predetermined time elapses, the control unit 150 of the lighting device 100 may store in the storage unit 110 an indication or information regarding a scenario included in the control message.

In one embodiment, the control message may include therein an identification number associated with the control message. The control device 500 may directly store the identification number of the control message as a scenario identification number. In one embodiment, in order to distinguish between a pre-stored scenario and a currently received scenario, a separate identification for the control message may be added when the control message is stored as the scenario.

When the control device 500 cancels an execution of the previously transmitted control message, only the identification number of the control message to be canceled may be sent. In response, the control unit 150 of the lighting device 100 may search for and delete the control message to be canceled as stored in the storage unit 110 as a corresponding scenario. Alternatively, when the scenario to be canceled is a currently activated scenario, activation of the scenario may be interrupted.

Control_Message1="ID0010/TO: GROUP1/19:25/Scenario 003"

In one embodiment, the control message "Control_Message1" as described above may be converted into a scenario according to the configuration of FIG. 2 as follows:

TABLE 1

| Group identification information | Scenario identification information | StartTime | Pattern |
|---|---|---|---|
| GROUP 1 | CM001 | 19:25 | Scenario 003 |

In this way, the control message may be stored as a corresponding scenario.

In particular, when during the performance, the control device 500 wishes to change a scenario to be played in 5 to 10 minutes or thereafter, or to insert a new pattern into the corresponding scenario, a control message containing a group identification number corresponding to the scenario may be delivered to the communication devices 200a to 200m based on the procedure of FIG. 6. Then, the communication devices 200a to 200m and the lighting devices communicate with each other, such that the new scenario may be stored in the lighting device.

When using the push server shown in FIG. 1 to FIG. 6, a push service using the MQTT protocol may be employed to control the lighting devices in a space that accommodates a large number of personnel, such as a theater. Subsequently, an illumination control signal may be transmitted based on the push service. In an embodiment of the present disclosure, the push server may pre-store the control message to simultaneously send the control message to a plurality of communication nodes (i.e., communication devices). The push server may include information necessary for controlling the scenario into the control message and may transmit a real-time execution message in a triggering manner to prevent communications from being missed. In particular, when the communication is based on the push service, it may be sufficient that only communication devices (mobile phones, smart phones, etc.) possessed by the respective users are used without needing to construct a separate communication system.

Figure 7:
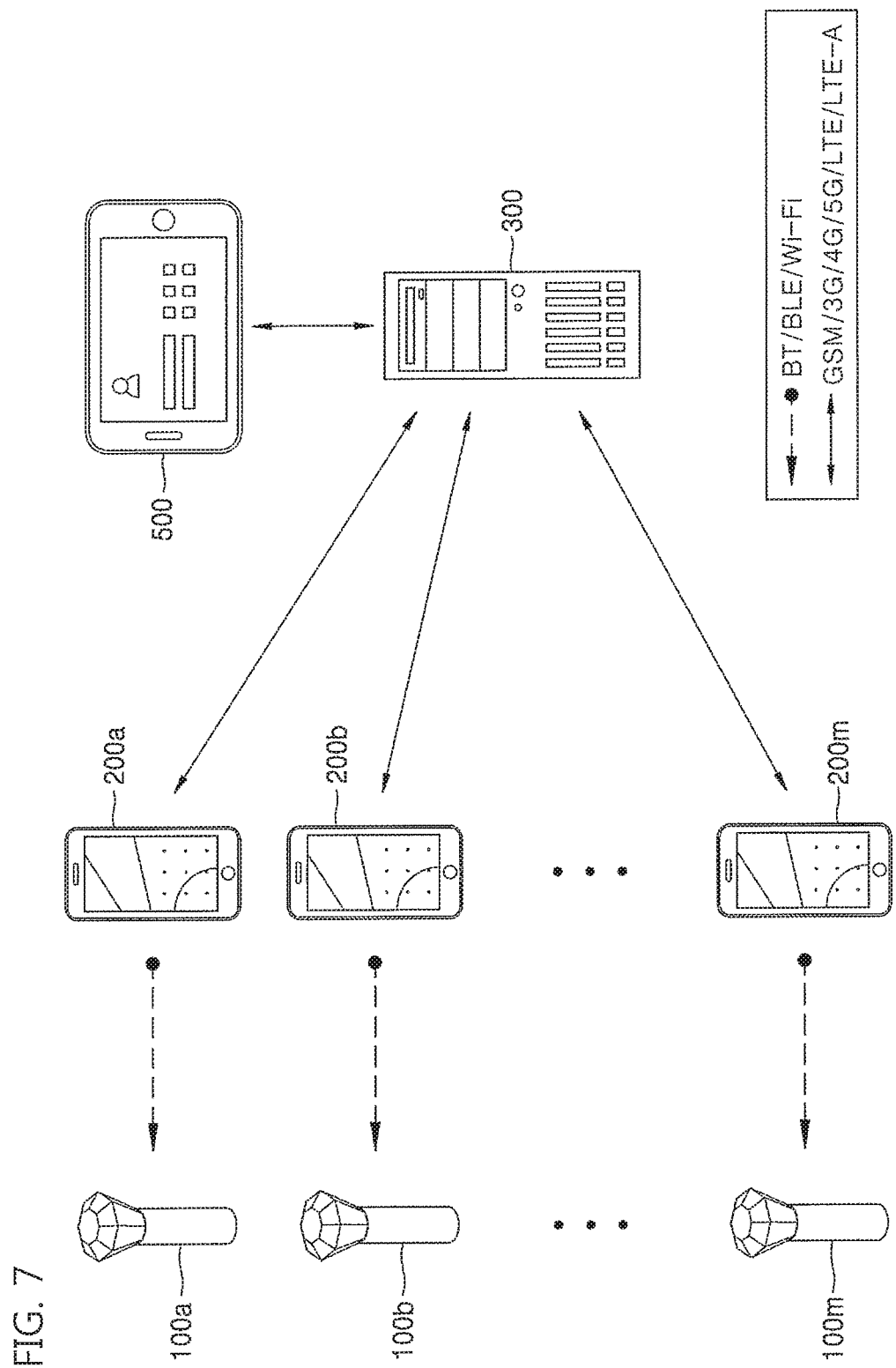
FIG. 7 and FIG. 8 show characteristics of communication between a push server and communication devices and lighting devices according to one embodiment of the present disclosure.
Figure 8:
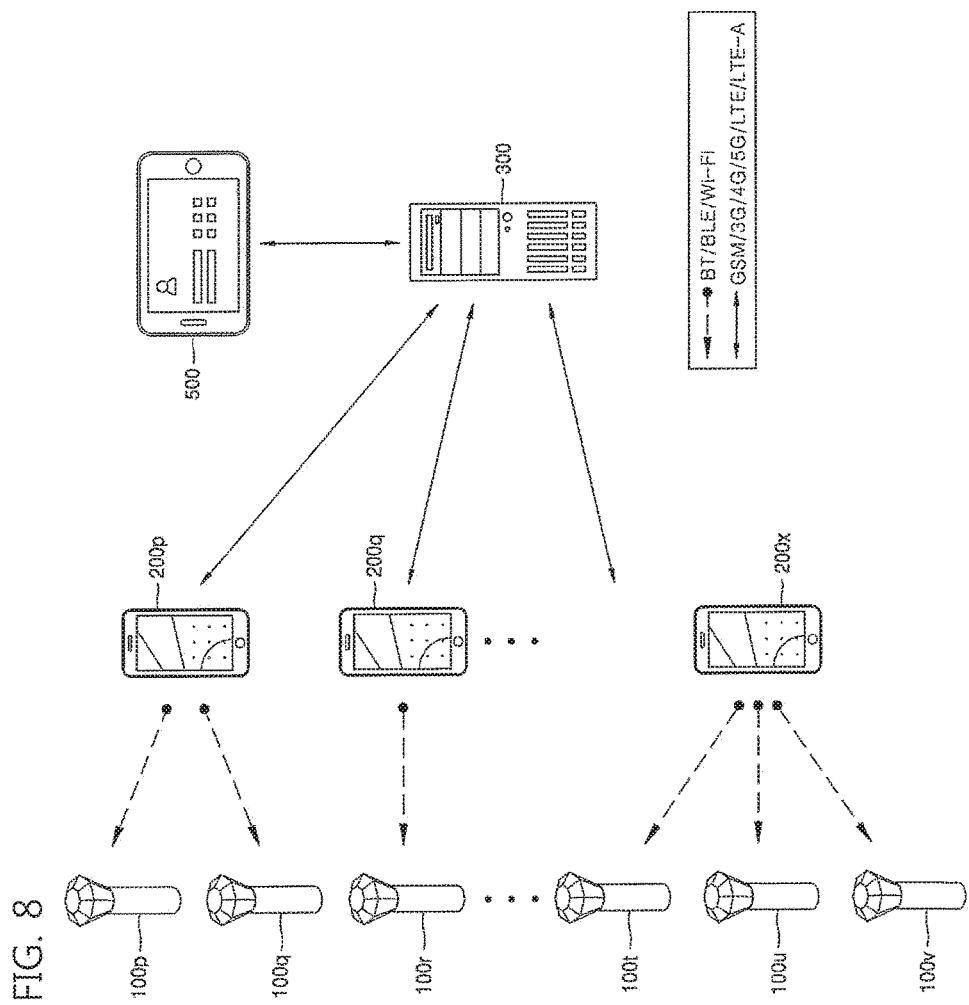

FIG. 7 and FIG. 8 show characteristics of communication between push servers and communication devices and lighting devices according to one embodiment of the present disclosure. FIG. 7 illustrates an embodiment where communication devices 200a to 200m and lighting devices 100a to 100m are paired with each other in a 1:1 relationship.

Referring to FIG. 7, the control device 500 sends the first control message to the push server 300. The push server 300 converts the received first control message into the second control message associated with the identification information of each of the communication devices 200a to 200m. In one embodiment, the push server 300 may transmit the second control message to the plurality of communication devices 200a to 200m in a unicast/push manner. In this transmission process, the second control message may be converted, via the push gateway such as an MQTT broker, to a third message that is the same as or partially modified from the second message. Then, the third message is transmitted to the communication devices 200a to 200m.

In FIG. 7, the communication between the control device 500 and the push server 300 and the communication between the push server 300 and the communication devices 200a to 200m may be performed based on mobile communication. That is, the communications may be based on Long Term Evolution (LTE) such as GSM (Global System for Mobile communication)/3G (Third Generation)/4G (Fourth Generation)/5G (Fifth Generation) or LTE-A (LTE Advanced). On the other hand, communications between the communication devices 200a to 200m and the lighting devices 100a to 100m may be performed based on Bluetooth (BT), BLE, Wi-Fi, and the like.

FIG. 8 illustrates an example of pairings between the communication devices 200p to 200x and the lighting devices 100p to 100v in a 1:N (N>=1) relationship, unlike FIG. 7. In FIG. 8, a communication device indicated as 200p delivers the received control message to two lighting devices 100p and 100q. Likewise, a communication device indicated as 200x delivers the received control message to three lighting devices 100t, 100u, and 100v. As may be seen from FIG. 8, the communication device controls two or more lighting devices. Thus, the number of communication devices receiving the control message from the push server 300 may be reduced within the entire venue. This may lead to improving communication efficiency.

In FIG. 7 and FIG. 8, communication between the communication devices 200a to 200x and lighting devices 100a to 100v may be based on a corresponding communication protocol relationship. Accordingly, the communication device receives the control message transmitted from the push server 300 in a push manner, based on the first protocol.

The communication device may send the received control message to one or more lighting devices based on the second protocol.

In this connection, when the communication device receives the control message having an identification information of the communication device as a destination information thereof, the communication device provides the control message to an application of the communication device operating in a background. Then, the application may send the received control message to the lighting devices based on the second protocol.

Figure 9:
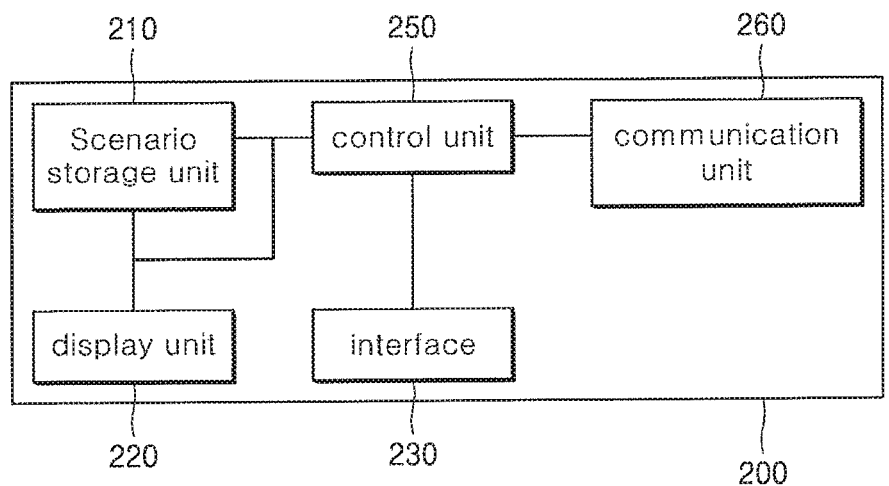
FIG. 9 shows a configuration of a communication device according to one embodiment of the present disclosure.

FIG. 9 shows a configuration of a communication device according to one embodiment of the present disclosure. A communication device 200 controls a scenario-activation based lighting device using a push service.

The communication device 200 may include a scenario storage unit 210 for storing scenarios therein, a communication unit 260, a display unit 220 for outputting specific information, an interface 230 for receiving, for example, a touch input from a user, and, a control unit 250 for controlling these components.

The communication unit 260 receives a control message transmitted from the push server 300 in a push manner, based on the first protocol. The communication unit transmits the received control message to one or more lighting devices, based on the second protocol. Herein, one or more lighting devices may refer to lighting devices that receive the control message from one communication device paired with one or more lighting devices, as shown in FIG. 7 or FIG. 8.

The first protocol may be a protocol based on mobile communication, as shown in FIG. 7 and FIG. 8. Such a first protocol may include LTE (Long Term Evolution) such as GSM/3G/4G/5G or LTE-A (LTE Advanced) in one embodiment. Alternatively, the first protocol may include the MQTT protocol associated with the mobile communication as described above.

On the other hand, the second protocol may include, in one embodiment, short range communication based on RF (Radio Frequency), such as Bluetooth, Bluetooth Low Energy (BLE), Wi-Fi, ZigBee, etc.

In FIG. 9, the scenario storage unit 210 may optionally be included. In one embodiment, a communication device that has transmitted a scenario to a lighting device may be the same communication device that delivers a control message later. In another embodiment, after the first communication device transmits the scenario, a new second communication device may be paired with the lighting device in the venue. In this case, the second communication device may forward only the control message to the lighting device without having to save the scenario therein.

Moreover, the control unit 250 of the communication device 200, which intends to transmit the control message, may also drive an application of the device 200. The application may run in the background. In one embodiment, when a control message having identification information of the communication device 200 as destination information thereof has been received directly or indirectly by the device 200 from the push server, the control unit 250 may provide the control message to the application running in the background. In this connection, the application and communication unit 260 may send the received control message to the lighting device, based on the second protocol.

The reception of the control message may include a direct or indirect reception of the message from the push server. In the case of the indirect reception, in one embodiment, the push gateway may receive the control message from the push server and send the same to the communication device.

In this connection, the push gateway may include, in one embodiment, a push broker associated with a communication service providing a mobile communication service to the communication device. In another embodiment, the base station may serve as the push gateway.

Figure 10:
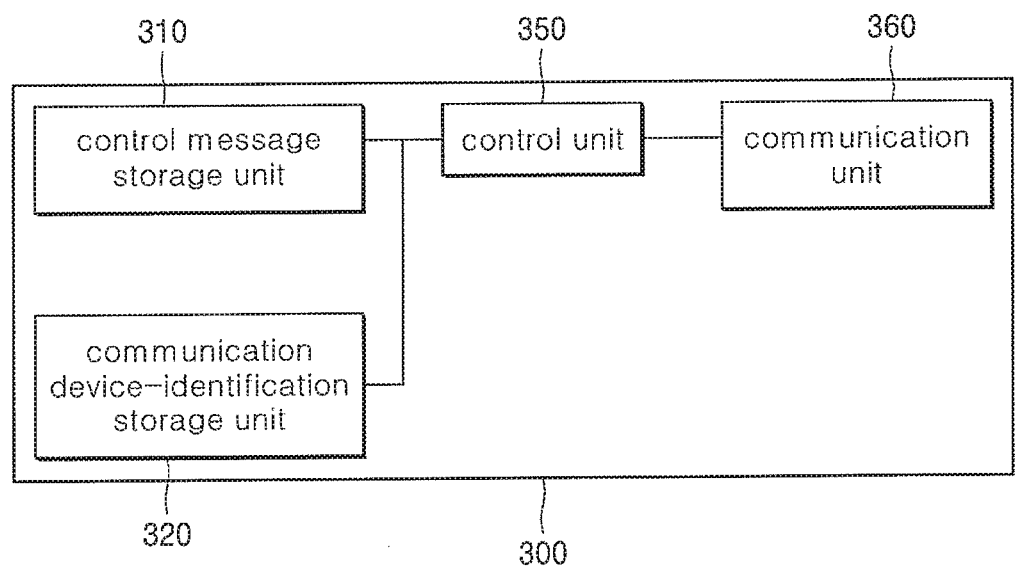
FIG. 10 shows a configuration of a push server according to one embodiment of the present disclosure.

FIG. 10 shows a configuration of a push server according to one embodiment of the present disclosure. The push server may transmit the control message to a plurality of communication devices using a push service such as the MQTT as described above. To this end, the push server 300 may store identification information for each communication device to receive the control message into a communication device-identification information storage unit 320.

Moreover, the push server 300, as shown in FIG. 7 and FIG. 8 may include a communication unit 360 for receiving a control message from the control device 500, based on the first protocol, and for transmitting the received control message to either the communication device or the push gateway, based on the first protocol. Further, the push sever 300 may further include a control message storage unit 310 for storing the control message. The first protocol may be embodied as be a protocol based on mobile communication as shown in FIG. 7 and FIG. 8. The first communication protocol includes LTE (Long Term Evolution) such as GSM/3G/4G/5G, or LTE-A (LTE Advanced), in one embodiment.

When the control unit 350 for controlling the above-described components has received the control message from the control device 500, the control unit 350 extracts identification information of a communication device corresponding to destination information thereof, from a communication device-identification information storage unit 320. Then, the control unit may transmit the control message to the corresponding communication device in a unicast manner. Alternatively, the control unit may transmit, in a multicast or broadcast manner, to the communication devices included in a plurality of groups.

The control unit 350 may use the control message generated by the control device 500 in a non-modified manner. Alternatively, the control unit 350 may convert the control message to be adapted to a communication protocol, or change the control message to be adapted to a communication device as a destination of the control message.

The control message may include one or more of a control message for starting a scenario stored in the communication device, a control message for disabling the currently-activated scenario, or a control message for indicating a specific pattern. In addition, the push gateway includes a push broker associated with a communication service providing a communication device with a mobile communication service, in one embodiment. Alternatively, the base station may serve as a push gateway. The push server 300 may send the control message directly to the communication device. Alternatively, the push server may indirectly send the control message to the communication device via the push gateway (push broker).

In addition, when the push server 300 is in the process of initiating communication with the control device 500, the communication unit 360 receives from the control device, identification information of the communication device to receive the control message. The push server 300 may store the received identification information in a communication device-identification information storage unit 320.

Figure 11:
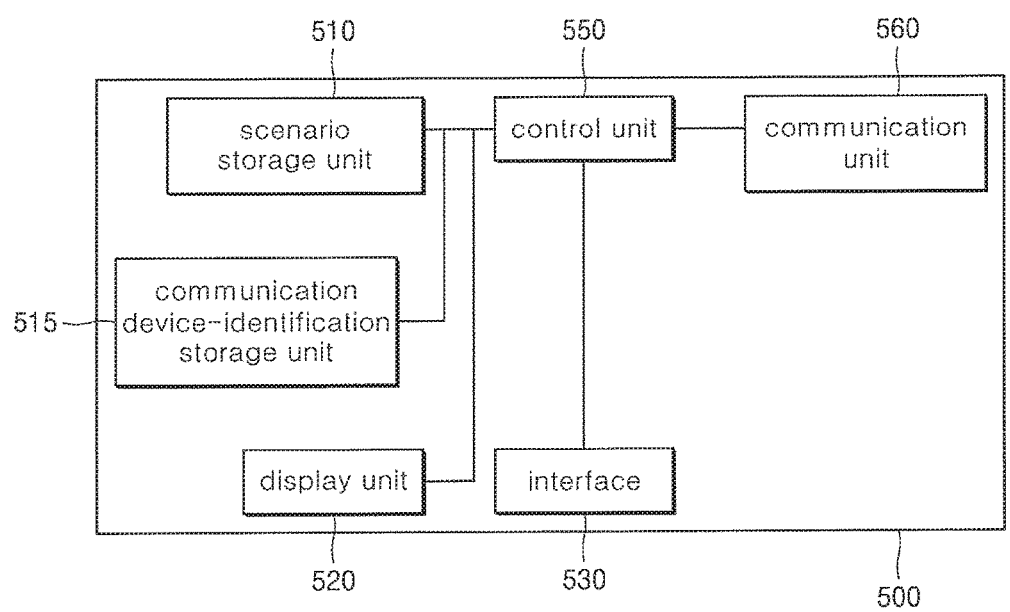
FIG. 11 shows a configuration of a control device according to one embodiment of the present disclosure.

FIG. 11 shows a configuration of the control device according to one embodiment of the present disclosure.

The control device includes a storage unit 510 for storing scenarios, a communication unit 560, a communication device-identification information storage unit 515 for storing identification information of the communication device, a display unit 520, and an interface 530.

The control unit 550 controls the above-described components.

The control device 500 allows a performance planner to control the lighting devices in real time using the communication device in the theater.

The control unit 550 generates a control message including at least one of a control message for starting a stored scenario, a control message for stopping the currently-activated scenario, or a control message for indicating a specific pattern. The communication unit 560 transmits the generated control message to the push server. In this regard, the communication unit transmits the control message to the push server using the above-mentioned mobile communication protocol, for example, GSM/3G/4G/5G/LTE/LTE-A. In this process, the communication unit may in advance deliver, to the push server, identification information about communication devices to receive the control message. Alternatively, the communication unit may transmit identification information for the communication devices together with the control message. The interface 530 receives input information necessary to generate the control message. When the user performs, for example, a touch input, the interface 530 may receive and process the touched input. The performance planner may control the interface 530 to change, control, or create a scenario in real time.

In addition, the control device may simulate a stored scenario or control message and outputting the simulated scenario or control message to the display unit 520. More specifically, the control unit 550 generates a control message that initiates a stored scenario or stops a currently-activated scenario or indicates a specific pattern. The interface 530 may be configured as a touch screen or button. The interface may receive input information necessary to generate the control message. In addition, the control device 500 further includes a display unit 520. The control unit 550 may simulate the stored scenario or control message and output the same to the display unit. The simulation may simulate current operation patterns of lighting devices and simulate future operation patterns of lighting devices.

The control device 500 may be a device owned by a planner or a person controlling a light in a concert hall or concert, and may be a computer, a smart phone, or a tablet computer. The display unit 520 of the control device 500 may be configured to display, on a display unit 510, the simulation based on activation of a scenario stored in the storage unit 510 or based on a new control of the control device 500. This scenario activation simulation may be similar to the scenario activation by the multiple lighting devices operating based on a scenario in a venue.

Figure 12:
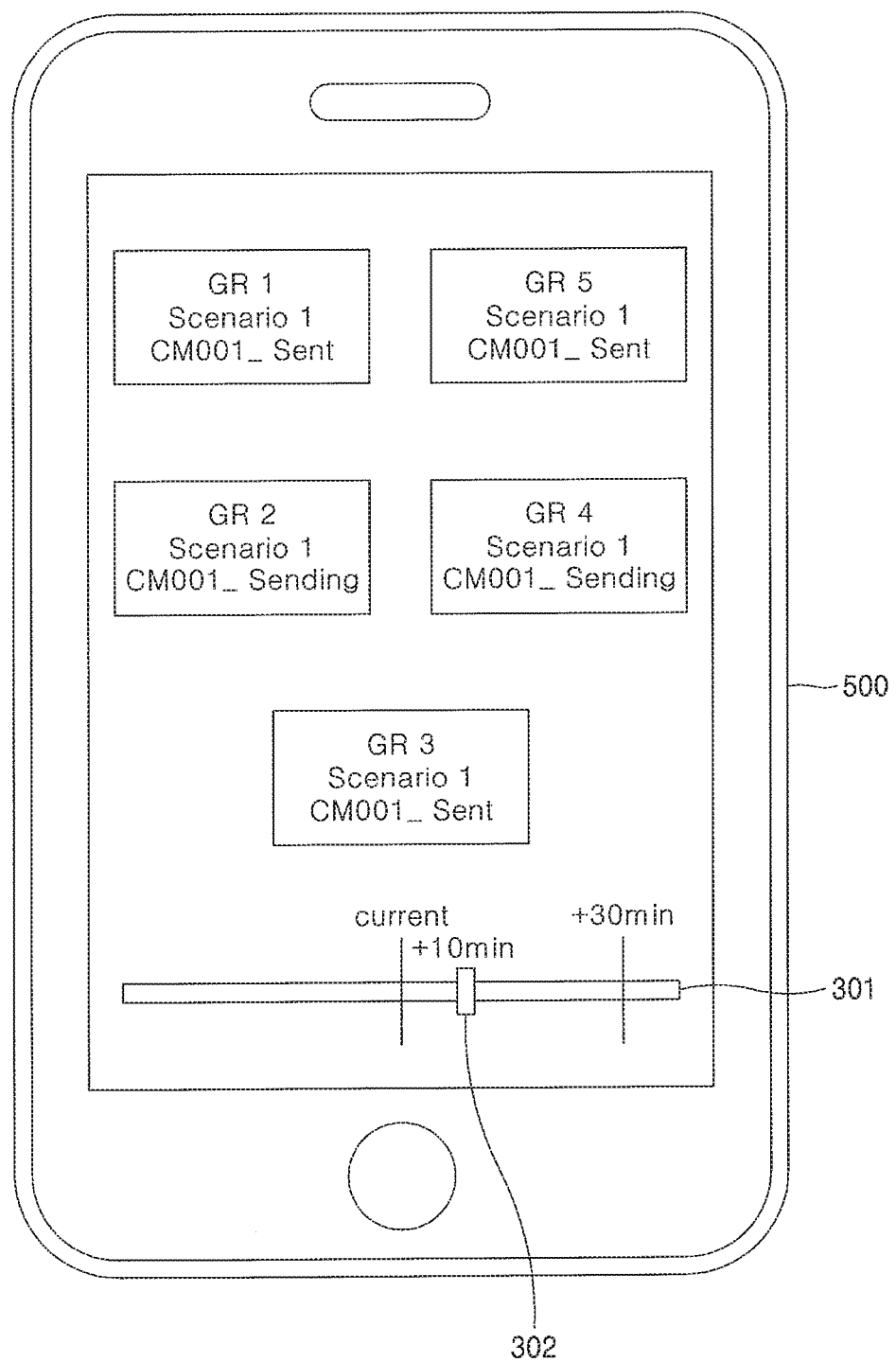
FIG. 12 is a diagram showing timing-based control.

In addition, the control device 500 may have a temporal difference in controlling the scenario. FIG. 12 shows a temporal-difference based control. FIG. 13 shows a state in which lighting devices are controlled by a communication device in a theater.

In FIG. 12, an arrangement of the groups corresponds exactly to an arrangement at the venue in FIG. 13. That is, an arrangement of first to fifth groups in FIG. 13 may be displayed, in the same manner, on the display unit of the control device 500 as shown in FIG. 12. Referring to FIG. 12, each group indicates a currently activated scenario, which may be displayed as a character (or text). In this connection, the actual activated patterns of the lighting devices may be visually displayed. The control messages for controlling the lighting devices of the groups respectively may be displayed to have temporal differences in activation therebtween.

For example, each of GR1/GR3/GR5 corresponding to 1/3/5 groups (901, 903, and 905 in FIG. 13) is activating "Scenario1". In this regard, CM001_Sent is displayed, indicating that the control message CM001 has been transferred. In FIG. 13, the communication devices 201a, 201b, 201f, and 201i corresponding to 1/3/5 groups transmitted the control messages. In FIG. 13, the communication devices 201a, 201f, and 201i connected to two or more lighting devices by dashed lines may be paired with the two or more lighting devices to transmit the control messages to the paired lighting devices.

Next, each of GR2/GR4 corresponding to 2/4 group (902 and 904 in FIG. 13) is also activating "Scenario1". In this regard, CM001_Sending is indicated, indicating that the control message CM001 is being transmitted. In FIG. 13, the communication devices 201c, 201d, 201e, 201g, and 201h corresponding to 2/4 group are transmitting control messages. This corresponds to a process in which the push server 300 transmits, based on the first protocol, the control message in the push manner using the identification information of the communication devices belonging to the corresponding groups.

FIG. 12 and FIG. 13 are summarized as follows. The control device 500 may adjust control message transmission timing based on an arrangement of communication devices, i.e. based on the grouping of communication devices. In addition, when the push server 300 transmits a control message to communication devices belonging to a specific group which is a destination of the control message, the control message transmission timing may be adjusted. For example, the control device may instruct all lighting devices to activate "scenario 3". In this connection, start times of "scenario 3" for the groups of communication devices corresponding to or connected to the lighting devices may differ by 20 seconds as shown in Table 2. In this case, when information about communication devices corresponding to the groups are stored on a group basis in the communication device-identification information storage unit 515 of the control device 500, the control message transmission timing may be adjusted.

TABLE 2

| GR | Scenario Number | StartTime |
| --- | --- | --- |
| GR1 | Scenario003 | 19:50:05 |
| GR2 | Scenario003 | 19:50:25 |
| GR3 | Scenario003 | 19:50:45 |
| GR4 | Scenario003 | 19:51:05 |
| GR5 | Scenario003 | 19:51:25 |

The start times differs between the groups. Thus, even though there is enough time to transmit the control message, the following procedure may be executed to reduce the transmission timing of the push scheme based message by the push server 300 and to prevent transmission errors: a control message may be first transmitted to the communication devices belonging to a specific group; next, a control message may be transmitted to communication devices belonging to the next group with a time interval of 1 second or more.

In one embodiment, information about the signal interference probability for each group may also be stored. That is, information on the proximity between the groups may be separately stored in the storage unit 515, and, thus, the transmission timing of the control message can vary depending on the proximity information.

TABLE 3

| Group Number | Neighbor_Number |
|---|---|
| GR1 | GR2, GR5 |
| GR2 | GR1, |
| GR3 | GR4 |
| GR4 | GR3 |
| GR5 | GR1 |

When the control device 500 and push server send control messages to communication devices belonging to GR 1, the control message may be sent simultaneously to another group GR3 that is not adjacent to GR1. Further, GR2, GR4, and GR5 may simultaneously transmit control messages.

In order to allow the temporal difference in the above-mentioned control message transmission, a following procedure is executed: When the control device transmits a message to the communication device, the control device selects communication devices which are transmission destinations of the message. The control device may transmit, to the push server, the information (or group information) of these selected communication devices together with the control message. For example, when a control device transmits "Control_Message1" to a push server, and the control device provides identification information or group identification information of the selected communication devices together with the control message, the push server may forward the received control message only to the selected communication devices.

Thereafter, the control device provides the push server with identification information or group identification information of another selected communication devices.

When the controlling device transmits the same "Control_Message1" to the push server, the push server forwards the received message to the newly selected communication devices.

In FIG. 12, the user may control the lighting devices by touching the display unit of the control device 500 to activate the corresponding group to create a new control message, or to stop the activation of the scenario of the specific group. In addition, based on input to an interface such as a touch screen of the control device 500, the control device 500 may generate a control message and send the control messages to the lighting devices via the push server and communication devices. In this way, the lighting device may be controlled.

In one embodiment, on the bottom of the display unit, interface portions 301 and 302 for adjusting the simulation timing may be arranged. The interface portion 301 shows the overall time flow. When the timing adjusting bar 302 is moved to a point indicated by +10 minutes, the lighting devices belonging to each group may simulate scenario activation in a next 10 minutes. In another example, the user shifts the timing adjusting bar 302 to a corresponding future specific time (e.g., +30 minutes). In this connection, the control device 500 generates a control message and transmits the control message at the corresponding time point (for example, after 30 minutes).

As shown in FIG. 11 through FIG. 13, the control device may transmit a control message to the selected communication device using the identification information of the communication device. The push server transmits the control message only to a communication device corresponding to the identification information of the communication device, which is a destination of the control message. This allows the lighting device to be effectively controlled.

Implementing the embodiment of the present disclosure may be as follows: when in a space where a plurality of lighting devices are distributed, a push method is used, and a control message for controlling the lighting device may be provided to the lighting device via the communication device without time delay. In particular, the control message may be transmitted using a specific push service such as MQTT service in a space where a plurality of communication devices are arranged.

In addition, many lighting devices operate based on preset patterns or scenarios. The push server transmits, in a push manner, a control message of a small size to a communication device paired with the lighting devices or the plurality of lighting devices. Thus, without a time delay, the push server may reliably deliver the control message of relatively small size to the communication device. The control message delivered to the communication device may be passed to one or more lighting devices that are paired with the communicate device, thereby activating the scenario stored in the lighting device.

Furthermore, control messages may be repeatedly transmitted. Even when some lighting devices do not receive messages from the communication device, the communication device may send a message repeatedly. Further, the communication device may also repeatedly receive the control message from the push server.

Furthermore, the implementation of the present disclosure may be as follows: based on the physical locations of multiple lighting devices, or the arrangement of the device groups, the communication timing difference is set between the device groups during transmission of the control message. This allows the push server to effectively transmit the control message. This allows all lighting devices to receive the control message via the communication device.

Although all the components that constitutes the embodiment of the present disclosure are described to be combined into a single module or to operate in a combined manner, it will be appreciated that the present disclosure is not necessarily limited to this embodiment. All of the component may also operate in a combined manner of selected one or more components within a scope of the present disclosure.

In addition, although each of the components may be implemented as a single independent hardware, some or all of the components may be selectively combined to be implemented as a computer program having a program module having one hardware or a combination of hardware that performs some or all of functions as described above. Codes and code segments for configuring the computer program may be easily inferred by those skilled in the art of the present disclosure. Such a computer program may be stored in a computer readable storage medium. When the computer readable storage medium is executed by the computer, the codes and code segments may implement the embodiments of the present disclosure. The storage medium of the computer program includes a magnetic recording medium, an optical recording medium, and a storage medium including a semiconductor recording element. Further, a computer program that implements embodiments of the present disclosure includes a program module that is transmitted in real time via an external device.

Accordingly, in accordance with the present disclosure, a control device and a control method for controlling the lighting devices so that the lighting devices operate without temporal errors is disclosed herein.

The present disclosure is intended to solve the previously discussed problems associated with scenario activation and control of a large number of lighting devices. The present disclosure is to provide a method and device for providing lighting devices distributed in a space with a control message to control the lighting devices without time delay.

The present disclosure provides a method and device, by which multiple lighting devices operate based on preset patterns or scenarios, and, a control message of a small size is transmitted to the lighting devices in a push manner, thereby transmitting the control message to the lighting devices without time delay.

In particular, the present disclosure provides a method and device, by which one or more lighting devices are paired to a specific communication device, and the communication device receives a control message in a push manner, such that a control device transmits the control message to the specific communication device. In this connection, the present disclosure provides a method and device, by which communication devices are grouped into groups, and, group-based control is performed, such that transmission of the control message in the push manner is more effectively performed.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

According to one embodiment of the present disclosure, there is provided a lighting device based on scenario-activation using a push service. The lighting device includes: a light source for outputting light; a storage unit for storing therein at least one scenario for controlling light output from the light source; a communication unit for receiving the scenario from a first communication device and for receiving, from a second communication device, a control message for controlling operation of the scenario; and a control unit configured for controlling the light source based on the scenario stored in the storage unit and based on the received control message, wherein the first communication device and the second communication device are either the same or different.

According to another embodiment of the present disclosure, there is provided a control device for controlling a lighting device based on scenario-activation using a push service. The control device includes: a storage unit for storing therein a scenario; a control unit configured for generating a control message, wherein the control message includes at least one of a control message for starting the stored scenario, a control message for stopping a currently-activated scenario, or a control message for indicating a specific pattern; a communication unit for transmitting the generated control message to a push server; a communication device-identification storage unit for storing therein identifications of communication devices; and an interface for receiving input information required to generate the control message.

According to still another embodiment of the present disclosure, there is provided a push server for controlling a lighting device based on scenario-activation using a push service. The push server includes: a communication unit for receiving a control message, based on a first communication protocol, from a control device and for transmitting the received control message to either a communication device or a push gateway based on the first communication protocol; a control message storage unit for storing, therein, the control message; a communication device-identification storage unit for storing, therein, identifications of communication devices to receive the control message; and a control unit configured for controlling the communication unit, the control message storage unit, and the communication device-identification storage unit.

When applying the embodiments of the present disclosure, multiple lighting devices operate based on preset patterns or scenarios, the small sized control message is supplied to the lighting devices in a push manner. This allows the control message to be passed to the lighting devices without temporal delay.

Further, when applying the embodiments of the present disclosure, the push server transmits the control message to the communication device based on the group arrangement of the plurality of lighting devices. In this process, the transmission timing difference may be set between the device-groups.

Moreover, when applying the embodiments of the present disclosure, the control messages may be transmitted correctly. Further, the control messages may be transmitted repeatedly such that all lighting devices may reliably receive the control messages.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expression such as "at least one of" when preceding a list of elements may modify the entire list of elements and may not modify the individual elements of the list.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device based on scenario-activation using a push service, the lighting device comprising:

a light source;

a storage that stores at least one scenario that controls light output from the light source;

a communication module that receives the scenario from a communication device and receives a control message for controlling activation of the scenario from the communication device; and a controller configured to control the light source based on the scenario stored in the storage and the received control message, wherein the communication device includes a plurality of communication devices and the scenario and the control message are received from a same one of the communication devices or from different ones of the communication device, wherein the control message includes an identification of the communication device as a destination of the control message, and the communication device supplies the control message to an application operating on the communication device, and wherein the application controls transfer of the received control message to the lighting device.

2. The lighting device of claim 1, wherein the scenario includes one or more pattern of light output from the light source, and wherein the pattern includes at least one of a color, brightness, timing, duration, flickering or blinking, or on/off control of the light source.

3. The lighting device of claim 1, wherein the control message includes an identification of one or more scenarios stored in the storage and information on activating the stored scenarios associated with the identification.

4. The lighting device of claim 1, wherein the control message includes at least one of a control message for activating the stored scenario, a control message for stopping a currently-activated scenario, or a control message for indicating a prescribed pattern of light output from the light source.

5. The lighting device of claim 1, wherein the control message is transmitted from the communication device to the lighting device, and wherein the control message is transmitted based on a communication protocol including at least one of Bluetooth, Bluetooth Low Energy (BLE), Zigbee, or Wi-Fi.

6. The lighting device of claim 1, wherein the communication device receives, based on a first communication protocol, the control message pushed from a push server, and the communication device transmits, based on a second communication protocol, the received control message to one or more lighting devices.

7. The lighting device of claim 1, wherein the communication device receives the control message based on a first communication protocol and the communication device transmits the control message to the lighting device based on a second communication protocol different than the first communication protocol.

8. The lighting device of claim 7, wherein the first communication protocol is a mobile communication protocol including at least one of GSM, 3G, 4G, 5G, LTE or LTE-A and the second communication protocol is at least one of Bluetooth, Bluetooth Low Energy (BLE), Zigbee, or Wi-Fi.

9. A control device for controlling a lighting device based on scenario-activation using a push service, the control device comprising:

a first storage that stores a scenario that controls light output from the lighting device;

a controller that generates a control message, the control message including at least one of a control message for activating the scenario, a control message for stopping a currently-activated scenario, or a control message for indicating a prescribed pattern of light output from the lighting device;

a communication module that transmits the generated control message to a push server;

a second storage that stores identification information of a plurality of communication devices; and an input interface that receives user inputs to generate the control message.

10. The control device of claim 9, wherein the control device further comprises a display, and wherein the controller is configured to simulate the stored scenario or the control message and output the simulation onto the display.

11. The control device of claim 9, wherein the control device controls the communication module to transmit the control message to a prescribed communication device using the identification information of the communication devices.

12. The control device of claim 11, wherein the scenario stored on the first storage corresponds to a scenario stored on the lighting device, and the control message includes an identification of the scenario stored on the lighting device and information on activating the scenario associated with the identification.

13. The control device of claim 9, wherein the communication module is configured to transmit the control message to the lighting device via the push server based on a first communication protocol between the communication module and the push server and a second communication protocol between the communication device and a corresponding lighting device, the first communication protocol being different than the second communication protocol.

14. The lighting device of claim 13, wherein the first communication protocol is a mobile communication protocol including at least one of GSM, 3G, 4G, 5G, LTE or LTE-A and the second communication protocol is at least one of Bluetooth, Bluetooth Low Energy (BLE), Zigbee, or Wi-Fi.

15. A push server for controlling a lighting device based on scenario-activation using a push service, the push server comprising:

a communication module that receives a control message from a control device based on a first communication protocol, and transmits the received control message to either a communication device or a push gateway based on the first communication protocol, wherein the control message includes information to control operation of a scenario for controlling the lighting device;

a control message storage that stores the control message;

a communication device-identification storage that stores identification of the communication device associated with the lighting device to transmit the control message; and a controller configured to control the communication module, the control message storage, and the communication device-identification storage.

16. The push server of claim 15, wherein the control message includes at least one of a control message for activating a scenario to control light output, a control message for stopping a currently-activated scenario, or a control message for indicating a prescribed pattern of light output from the lighting device.

17. The push server of claim 15, wherein the push gateway includes a push broker associated with a communication service providing a mobile communication service to the communication device.

18. The push server of claim 17, wherein the control message is transmitted through the push gateway based on MQTT protocol (message queuing telemetry transport protocol).

* * * * *